(12) United States Patent
Sherman et al.

(10) Patent No.: US 9,469,551 B2
(45) Date of Patent: Oct. 18, 2016

(54) FILTER CARTRIDGE

(71) Applicant: KX Technologies LLC, West Haven, CT (US)

(72) Inventors: Michael J. Sherman, Woodbury, MN (US); Stephen P. Huda, Shelton, CT (US)

(73) Assignee: KX Technologies LLC, West Haven, CT (US)

( * ) Notice: Subject to any disclaimer, the term of this patent is extended or adjusted under 35 U.S.C. 154(b) by 686 days.

(21) Appl. No.: 13/907,200

(22) Filed: May 31, 2013

(65) Prior Publication Data

US 2014/0353235 A1    Dec. 4, 2014

(51) Int. Cl.
*B01D 35/30* (2006.01)
*C02F 1/00* (2006.01)

(52) U.S. Cl.
CPC ............ *C02F 1/003* (2013.01); *B01D 35/30* (2013.01); *B01D 2201/302* (2013.01); *B01D 2201/4015* (2013.01); *C02F 2201/003* (2013.01); *C02F 2201/006* (2013.01)

(58) Field of Classification Search
CPC ............ C02F 1/003; C02F 2201/003; C02F 2201/006; B01D 2201/302; B01D 2201/4015; B01D 2201/34; B01D 2201/304; B01D 35/30

USPC .......... 210/450, 440–444, 236, 483, 90, 97, 210/117, 36, 361
See application file for complete search history.

(56) References Cited

U.S. PATENT DOCUMENTS

| | | | |
|---|---|---|---|
| 5,486,288 A | 1/1996 | Stanford et al. | |
| 5,591,332 A | 1/1997 | Reid et al. | |
| 5,753,107 A | 5/1998 | Magnusson et al. | |
| 6,027,644 A | 2/2000 | Magnusson et al. | |
| 6,193,884 B1 | 2/2001 | Magnusson et al. | |
| D455,814 S | 4/2002 | Magnusson et al. | |
| 6,543,625 B1* | 4/2003 | Le Roux ............. | B01D 29/114 210/437 |
| 6,632,355 B2 | 10/2003 | Fritze | |
| 7,708,148 B2 | 5/2010 | Fritze | |
| 8,216,463 B1 | 7/2012 | Baird | |

* cited by examiner

*Primary Examiner* — Madeline Gonzalez
(74) *Attorney, Agent, or Firm* — Robert Curcio; DeLio, Peterson & Curcio, LLC

(57) ABSTRACT

The present invention presents a removably secured seal for forming a second stage water-tight seal within a two stage cavity filter head assembly for mating with a complementary manifold having cylindrical (male) bayonet ports. The seal includes a base circumferential seal having a center aperture and sidewall members extending axially upwards from the base seal; the sidewall members being insertable within cavities or slots formed in the second stage recess cylindrical cavity sidewall.

19 Claims, 7 Drawing Sheets

FILTER CARTRIDGE

BACKGROUND OF THE INVENTION

1. Field of the Invention

This invention relates generally to a water filter cartridge for use in a water filtration system. The water filter cartridge may be used for example to treat microorganism contaminated water so as to provide water suitable for drinking. More particularly, the invention relates to a replaceable water filter cartridge for use in a refrigerator filtration system having an easily removable, circumferential basket seal that presents sealing surfaces in the radial and axial directions for interfacing with a manifold cylindrical port and bayonet locking scheme.

2. Description of Related Art

In recent years, as the public has begun to realize the benefits derived from drinking highly pure water, there has been a great increase in the sale and availability of household water filtration devices. Concurrently, refrigerator mounted water dispensers and automatic ice makers have become more commonplace. In response to this fact, water filters have been incorporated within household refrigerators to provide a filtered water supply for direct dispensing via the refrigerator water dispenser, or for use in making ice cubes via an automatic ice maker.

A typical residential water filtration system generally includes a distribution manifold configured to accept a prepackaged cartridge filter. The distribution manifold is typically adapted to connect either directly or indirectly to a residential water supply and to points of use, and may even allow for a drain connection. Generally, the prepackaged cartridge filter sealingly engages the distribution manifold such that an inlet flow channel connecting the residential water supply and the cartridge filter is defined, and at least one outlet flow channel connecting the cartridge filter and the points of use is defined.

It is common for refrigerators to have a water dispenser disposed in the door and in fluid communication with a source of water and a filter for filtering the water. Further, it is common for refrigerators to have an ice dispenser in the door and be in fluid communication with a source of water and a filter for filtering the water. Like the filters installed in a water purifier device, the filter installed in a refrigerator is degraded in its purification capabilities when it is used for a certain period of time. Thus, the filter installed in the refrigerator is periodically required to be changed for a new filter according to its lifespan. Replaceable filter cartridges require circumferential sealing with the manifold port in order to ensure a leak proof interface, especially when the filter-manifold combination is designed to remain unchecked for a considerable amount of time. The seals on the manifold cylindrical ingress and egress bayonet ports are generally not replaced when a new filter cartridge is installed, and over time these port seals have been shown to degrade and cause leakage. Consequently, the seal on the replaceable filter cartridge becomes integral to the integrity of the manifold-filter cartridge watertight bond. In some refrigerator water filtration systems, as a cost saving measure, the only seals for ensuring a water-tight bond are placed on the manifold bayonet ports, and thus the water filtration systems are more prone to leakage as these manifold port seals are exercised with each replacement cartridge installation. Rotational forces on the manifold port seals, which may vary depending upon variances in the complementary diameters of the manifold port and the filter cartridge receiving recess port, may be detrimental to the seal integrity yet unknown for a period of time to the user.

One such refrigerator water filtration system is disclosed in U.S. Pat. No. 5,753,107 issued to Magnusson, et al., titled "DRIPLESS PURIFICATION MANIFOLD AND CARTRIDGE." The filter cartridge is located in the interior of the refrigerator and mates with a manifold using a bayonet locking scheme. The preferred filter cartridges used with, and designed for, the manifold of the Magnusson design do not have any circumferential seals, such as O-rings, located adjacent their mating surfaces, and therefore the prevention of leaks in the water filtration system is totally dependent on the integrity of the O-rings that are placed on, and circumferentially surround, the male cylindrical bodies of the manifold. FIG. 1 depicts a general prior art manifold for receiving the filter cartridge of the present invention.

A filter cartridge for the Magnusson design is identified in U.S. Pat. No. 6,027,644 which issued to Magnusson, et al., on Feb. 22, 2000. This cartridge supports a bayonet fitting and the appurtenant O-rings to a seal free two stage recess, which arguably simplifies the construction of the cartridge versus "conventional" cartridges having bayonet fittings and circumferential O-rings. The conventional cartridges are known to provide generally a circumferentially sealed bayonet fitting which mates to a recess or pair of recesses at the manifold. In this manner, a large number of relatively costly O-ring seals are thus required to accommodate the disposable cartridges. The Magnusson system avoids the cost by mounting on the manifold ingress and egress ports the only seals used for securing a water-tight bond. However, over time, the manifold O-ring seals at the filter cartridge interface will degrade, and their sealing efficiency potentially compromised under rotational insertion forces with each introduction of new, replaceable, seal free filter cartridges.

Some replacement filter cartridges have included an additional O-ring mounted in the large female cylindrical cavity of the filter cartridge to provide additional sealing capability; however, the location of this O-ring seal makes it prone to movement and misalignment during installation.

SUMMARY OF THE INVENTION

Bearing in mind the problems and deficiencies of the prior art, it is therefore an object of the present invention to provide a filter cartridge as a replacement filter for water filtration manifold systems that are designed for interfacing with filter cartridges that do not have any circumferential water-tight seals.

It is another object of the present invention to provide a filter cartridge having a circumferential seal which will not move or misalign when subjected to the rotational and insertion forces during installation with a water filtration system manifold.

It is yet another object of the present invention to provide a circumferential filter cartridge seal which includes a sealing portion in the radial and axial directions for interfacing with a manifold cylindrical port and bayonet locking scheme.

It is a further object of the present invention to provide a filter cartridge seal that is securably fixed to the cartridge structure, and capable of easy removal for potentially reinserting the cartridge seal in other cartridge units.

Still other objects and advantages of the invention will in part be obvious and will in part be apparent from the specification.

The above and other objects, which will be apparent to those skilled in the art, are achieved in the present invention which is directed to a filter cartridge for mating with a two stage manifold comprising: a filter head having a top end with a two stage, coaxial cylindrical recess, the two stage recess including a first stage recess situated towards the top end of the filter head and extending axially away from the top end to form a bottom first stage recess floor, and a second stage recess situated at the first stage recess bottom floor, and extending axially away from the bottom floor and the top end, the second stage recess having a smaller diameter than the first stage recess; a housing secured by a water-tight bond to the filter head; a filter media within the housing and in fluid communication with the filter head; a seal insertably secured within the second stage recess, the seal having a base seal portion forming a circumferential seal with the second stage recess cavity wall, and an adjoining sidewall structure extending axially upwards from the base seal portion toward the first stage recess bottom floor.

The seal adjoining sidewall structure may comprise at least a plurality of resilient sidewall segments.

The base seal portion may comprise a resilient disc with a center circular aperture, and may be integrally formed with the adjoining sidewall structure. Slots may be formed within the second stage recess cavity wall to receive the sidewall segments, which may be compress fitted therein.

The plurality of resilient sidewall segments may be attached at a top end opposite the base seal portion by a bridge structure. The bridge structure may be fabricated from the same resilient material as the sidewall segments, and may be integral with the sidewall segments.

In a second aspect, the present invention is directed to a filter cartridge comprising: a housing having an open top end, and a closed bottom end; a filter media within the housing, having an open end cap at a first end and a close end cap at a second end; a filter head having a bottom end secured to the housing top end, and a filter head top end having a two stage cylindrical recess including a first stage recess having an open top end, a floor, and a first diameter, and a second stage recess having a second diameter, the first diameter greater than the second diameter, wherein the first and second stage recesses are coaxial, the second stage recess beginning at the first stage recess floor and extending axially downwards toward the filter media, the filter head top end adapted to receive complementary bayonet ports from a mating manifold; and a resilient seal insertably secured within the second stage recess of the filter head, including: a base circumferential seal; and a plurality of elongated members attached to, and extending axially from, the base circumferential seal; the resilient seal secured within the second stage recess by inserting the elongated members within slots formed within the second stage recess cavity sidewall.

The base circumferential seal may be formed in the shape of a washer, having a thickness extending axially upwards within the second stage recess towards the filter head top end, and having a center circular aperture for fluid flow.

The base circumferential seal may be integral with the plurality of elongated members.

Each elongated member of the resilient seal is secured to at least one adjacent elongated member.

The slots formed within the second stage recess wall may comprise elongated, axial cavities integrally formed with the second stage recess cavity sidewall; the slots are adapted to receive the elongated members of the resilient seal in a compression fit.

The elongated members of the resilient seal and the second stage recess cavity sidewall slotted segments may have arcuate faces directed radially inwards to form a cylindrical cavity wall for receiving a manifold bayonet cylindrical port.

The base circumferential seal includes an annular groove coaxial with the center aperture for receiving the manifold bayonet port.

In a third aspect, the present invention is directed to a filter head assembly for a filter cartridge comprising: a filter head including a two stage cavity having a first recess stage and a second recess stage, the second recess stage coaxial with the first recess stage and having a top surface coincident with a bottom surface of the first recess stage; and a resilient basket-shaped seal including a disc-shaped base seal having a center aperture and a plurality of elongated members attached to, or integral with, the base seal, extending perpendicularly from the base seal in an axial direction, and insertably attached to a cavity sidewall of the filter head second recess stage.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

Figure 1:
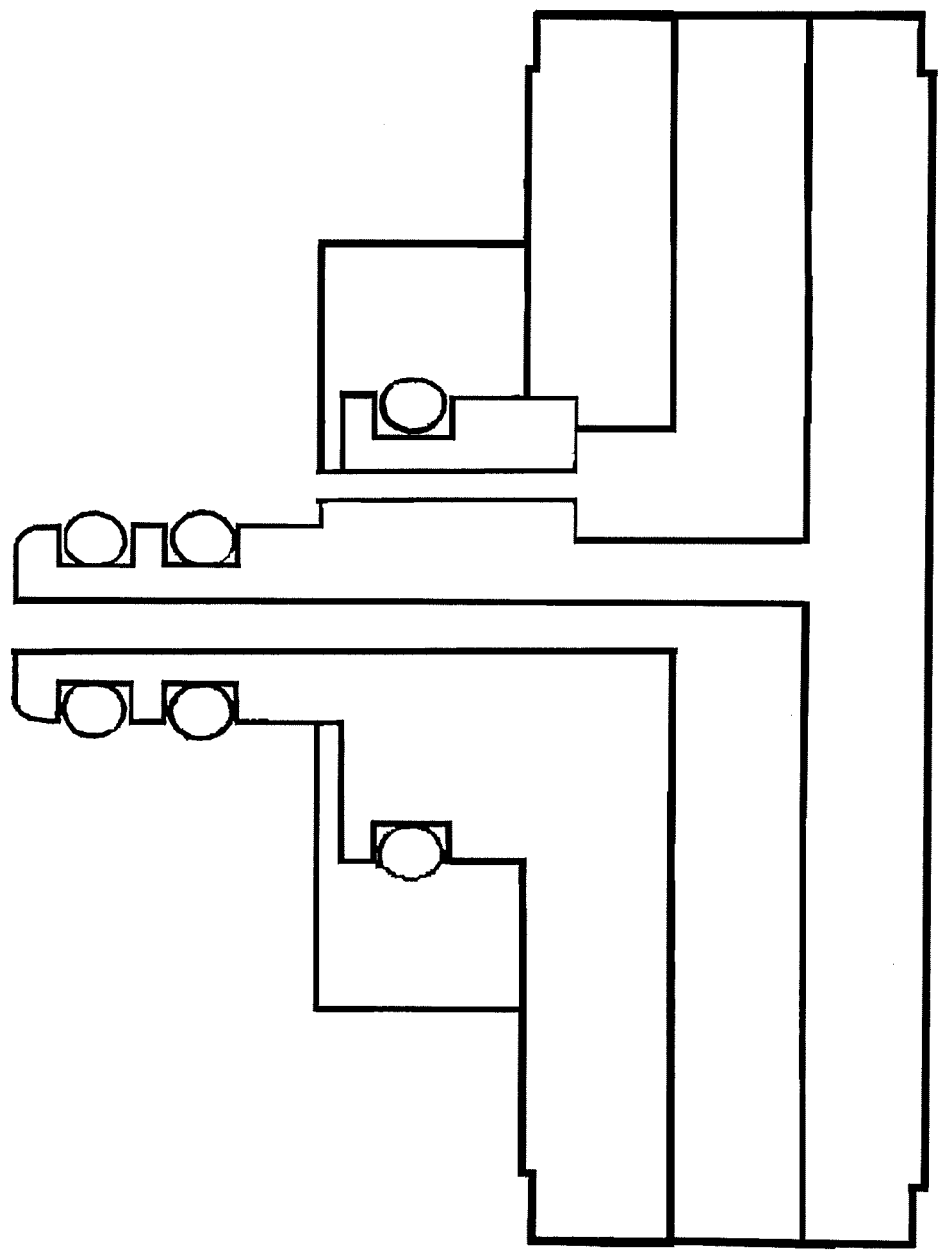
FIG. 1 depicts a prior art manifold design for mating with the filter cartridge of the present invention.

DESCRIPTION OF THE PREFERRED
EMBODIMENT(S)

In describing the preferred embodiment of the present invention, reference will be made herein to FIGS. 1-7 of the drawings in which like numerals refer to like features of the invention.

The present invention is directed to a replaceable filter cartridge for a refrigeration filtration system.

Replaceable filter cartridges for mating with refrigerator manifolds that include two coaxial male cylindrical bayonet style ingress and egress ports, such as the manifold of the Magnusson design described above, are either seal free, or adapted with a circumferential seal in the larger receiving recess cylindrical cavity. The present invention introduces a circumferential seal with a unique sidewall design within the smaller receiving recess cylindrical cavity. Generally, circumferential seals are circular O-rings seated at the bottom of a recess cavity. These O-ring seals are subject to rotational forces when the filter cartridge is inserted within the manifold housing and twisted to a locked position. The only forces maintaining the O-ring seal placement during this insertion are the frictional force between the O-ring seal and the recess cavity wall and floor.

To alleviate the detrimental effects that mechanical forces place on the circumferential seal, the present invention introduces a unique basket seal design that ensures a filter cartridge circumferential seal base or washer, such as a disc having a center aperture, is held in place during insertion by securing the basket seal side wall to the recess cavity wall. In one embodiment, the basket seal sidewall may be configured as structurally supporting elongated, longitudinal members attached to the circumferential seal base. The elongated seal members extend axially from the base of the circumferential seal, and are compress fitted within the recess wall cavities or slots, so that together with the recess wall members they form the cylindrical recess wall that receives the manifold cylindrical bayonet port. In this manner, the cylindrical recess wall is at least partially formed of resilient material to enhance the sealing efficiency with the mating manifold bayonet cylindrical port. The present invention places the basket seal within the second stage recess of the filter head cavity; however, the invention does not preclude placing a basket seal in the first stage recess or in both recesses.

The basket seal may be easily removed from the filter cartridge and replaced by pulling up on the basket seal sidewall. When the sidewall is segmented into elongated, longitudinal members, these members are secured to, or integral with, the base seal, and provide for the easy removal of the entire basket seal. In a preferred embodiment, the basket seal sidewall includes pairs of elongated members situated in diametrically opposing positions about the base circumferential seal. The base circumferential seal is in the form of a washer; disc shaped with a circular aperture in its center, and comprised of resilient material. Each elongated, longitudinal member of a pair forming the basket seal sidewall is preferably attached to one another by a bridge segment. In a preferred embodiment of the bridge segment design, pairs of elongated, longitudinal members are bridged together at or near their top, at a location opposite the seal base. The elongated longitudinal members may be uniform in thickness or preferably have a tapered thickness that increases in the axial direction. More preferably, the tapered thickness increases from the base seal to the top portion of the recess. The tapered geometry allows for easier insertion and removal, and assists in providing secure fit for the base circumferential seal on the recess floor. The filter head second stage recess cylindrical cavity wall includes formed slots for receiving the basket seal sidewall segments in a compression fit, exposing each sidewall segment radially inwards, with sidewall segment faces exposed to the receiving manifold cylindrical port.

The base circumferential seal is of appreciable thickness to rise axially up the side of the second stage recess cavity wall, thus forming a circumferential seal about the second stage recess wall. The base circumferential seal may also include a circular indentation or annular groove axially centered for receiving the manifold bayonet port cylindrical base. An aperture is located at the center of the base circumferential seal to accommodate fluid flow.

The basket seal of the present invention having a base circumferential seal and elongated sidewall members attached thereto is preferably made of a resilient material capable of forming a water-tight seal when compress fitted within the second stage recess by the manifold bayonet cylindrical port structure. A more detail explanation is provided herein with reference to the figures.

Figure 2:
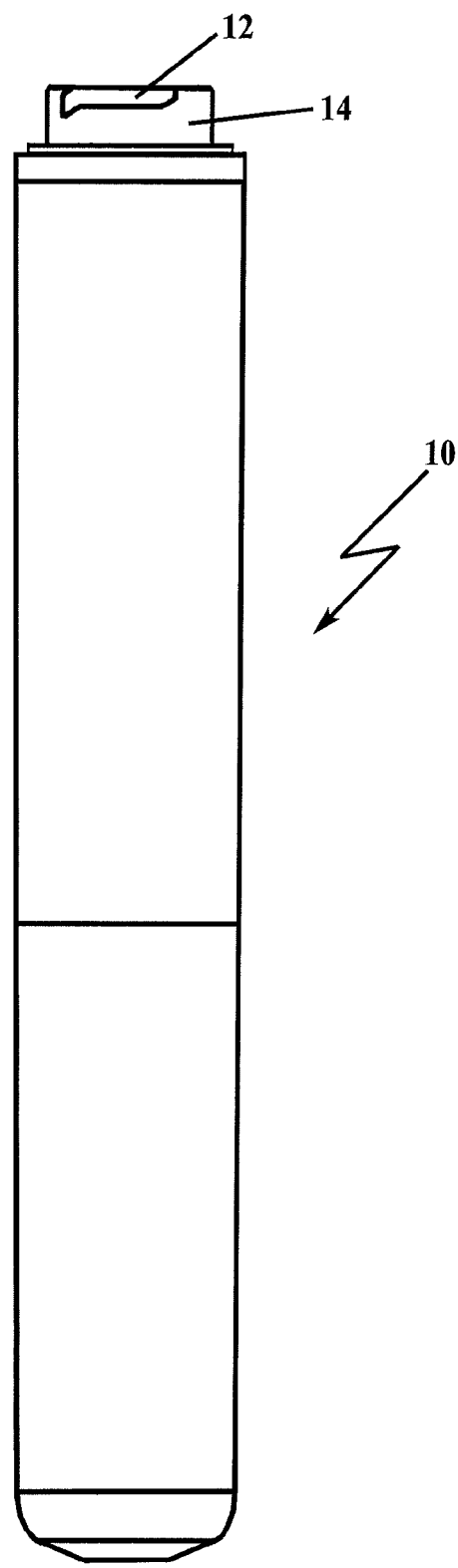
FIG. 2 is side view of the housing assembly of a replaceable filter cartridge of the present invention.

FIG. 2 is side view of the housing assembly of a filter cartridge 10 of the present invention. This replaceable filter cartridge 10 is designed to insert within, and provide a water tight seal with, manifolds having a two stage cylindrical bayonet port, such as the manifold design as depicted in FIG. 1. Radially displaced flanges 12 are situated opposite one another on the upper cylindrical receiving portion 14 of filter cartridge 10. Flanges 12 mate with a pair of interlocking flanges on the manifold. A dual, coaxial, cylindrical bayonet on the manifold is mounted into a two stage recess in a complementary cylindrical receiving cavity portion 14. The filter cartridge 10 is then rotated relative to the manifold flanges to interlock therewith, which secures the cartridge to the manifold and establishes a water tight seal for leak proof flow between the manifold and cartridge 10.

Figure 3:
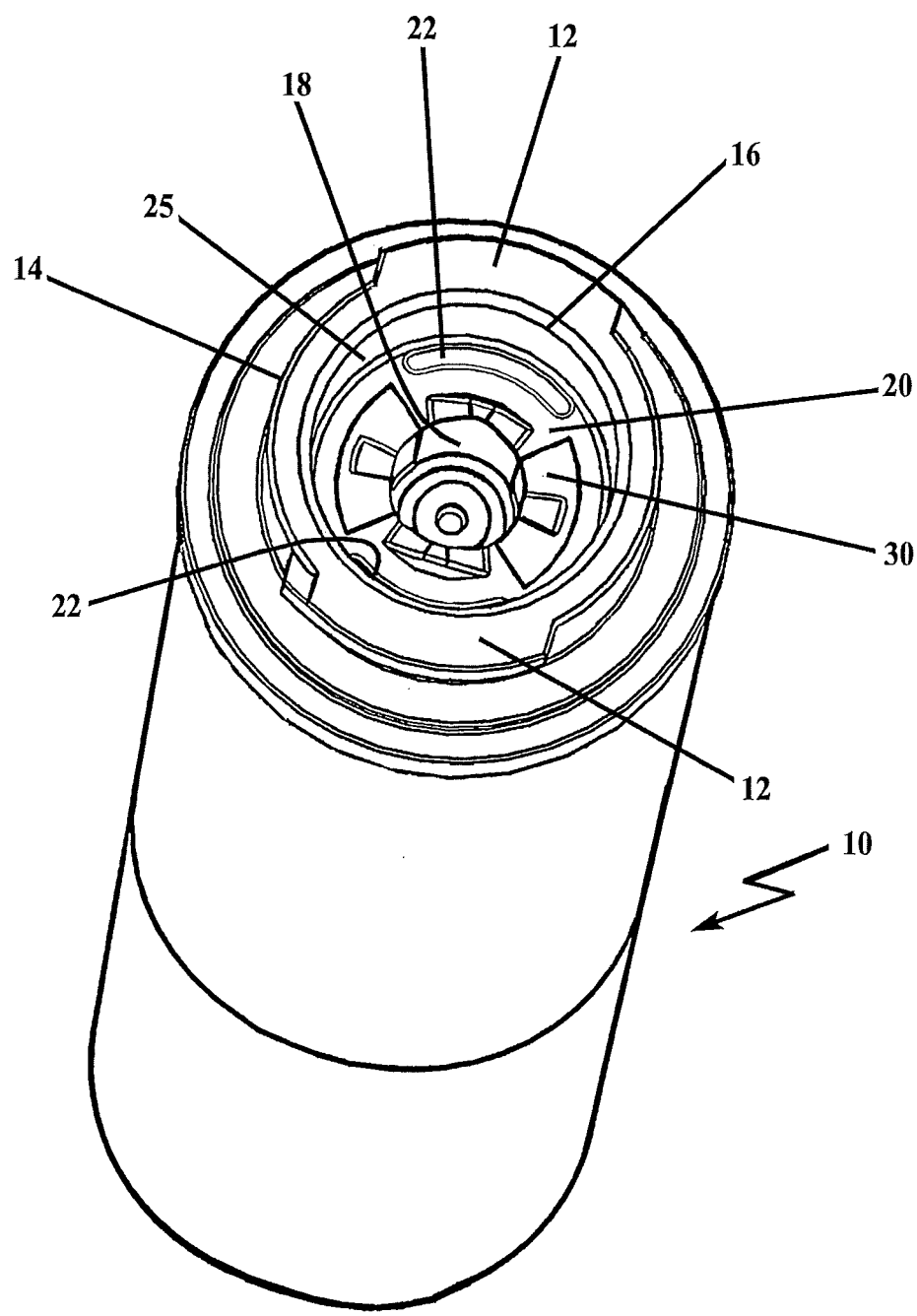
FIG. 3 depicts a top perspective view of the filter cartridge of FIG. 2.

FIG. 3 depicts a top perspective view of the replaceable filter cartridge 10 of the present invention. The upper cylindrical receiving portion 14 includes a two stage recess. A first stage recess 16 having a large diameter for receiving the large male cylindrical bayonet port of the manifold, and a second stage recess 18, coaxial with and having a smaller diameter than first stage recess 16. Second stage recess 18 is formed at the floor 20 of first stage recess 16, and extends axially downwards from floor 20 of first stage recess 16. These two recess stages are necessary to complement and receive the bayonet cylindrical ports of the manifold.

First stage recess 16 includes at least two flow ports 22 within floor 20. Flow ports 22 are preferably situated diametrically opposite one another. In at least one embodiment, flow ports 22 are elongated arcuate apertures; however, flow ports 22 may be any aperture shape, and in any number to allow sufficient volume flow under normal water flow operation. Flow ports 22 are preferably located close to the sidewall 25 of first stage recess 16, which would likely preclude the placement of an O-ring seal at this location.

To accommodate the location of flow ports 22, first stage recess 16 is not presented with any sealing function, such as internal O-ring seals. The large circumferential seal at the manifold bayonet large cylindrical port is relied upon to prohibit leakage for the first stage. It is noted that due to its larger size, this seal is more robust and less likely to exhibit the degradation expected of the internal seals of the manifold's second stage bayonet ports. Second stage recess 18 is configured with a removable, replaceable circumferential seal, securably held by the recess cavity wall to provide the additional sealing function to the manifold second stage bayonet port seals that are expected to degrade over time, and potentially shift under rotational insertion forces.

As depicted in FIG. 3, basket seal 30 extends from the bottom of second stage recess 18 where a base circumferential seal is located, to the floor 20 of first stage recess 16.

Figure 4:
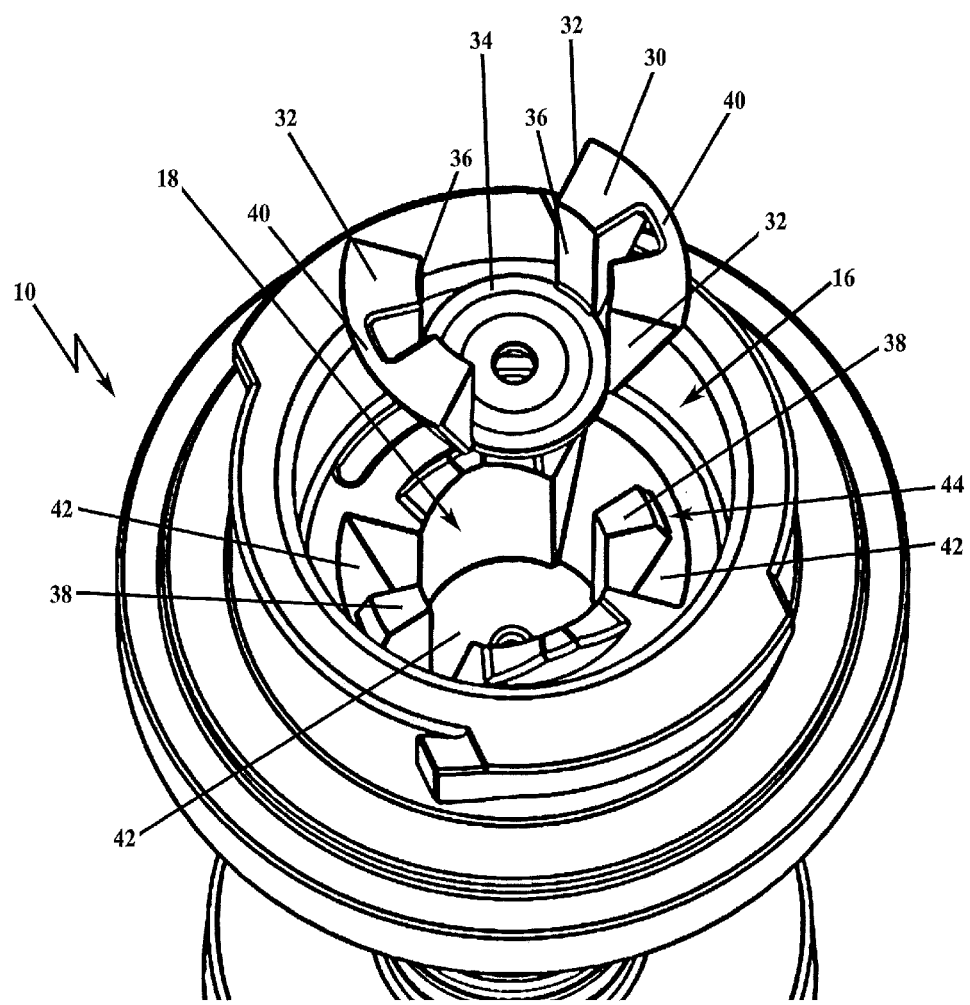
FIG. 4 depicts an exploded perspective view of the top portion of the filter cartridge of FIGS. 2 and 3.

FIG. 4 depicts an exploded perspective view of the top portion of cartridge 10. Basket seal 30 is shown elevated from its position within second stage recess 18. Basket seal 30 is so named for its unique structure. It is preferably fabricated of a resilient material, and may be synthetic rubber, Teflon, or other like material, that engages the complementary manifold bayonet port in a sealing fashion both along the longitudinal (axial) sides and at the bottom surface. Elongated members 32 extend in the axial direction from, and are secured to, base circumferential seal 34, in a similar manner that staves are used to form the sidewall of a barrel. In a preferred embodiment, elongated, axial extending members 32 are integral with base circumferential seal 34, and spaced apart for insertion within cavities or slots in the second stage recess sidewall.

Elongated axial extending members 32 include faces 36 internally exposed to the radial center of second stage recess 18. Faces 36 are arcuate and assist in forming a relatively seamless cylindrical recess cavity shape with complementary structural elongated members 38. Structural members 38 are formed within the inside wall of second stage recess 18, such that when basket seal 30 is inserted within second stage recess 18, elongated members 32 are placed within cavities or slots 42 formed by adjacent structural members 38 within the second stage recess sidewall, and the arcuate faces of these elongated members 32, 38 shape the cylindrical recess cavity of second stage recess 18.

In one embodiment, basket seal 30 includes at least two pairs of elongated members 32, diametrically opposed to each other. For each pair, the elongated members 32 are attached to base circumferential seal 34 at their lower end. The upper end of each elongated member 32 is attached to its adjacent elongated member pair, such that each pair is secured at its top and bottom. As shown in FIG. 4, the elongated members 32 of each pair include a bridge segment 40, preferably integral with the elongated members, to secure the top portion of an elongated member to its adjacent pair. The top surface of basket seal 30 is shaped predominately flat to contribute to forming the relatively smooth receiving bottom surface 20 of first stage recess 16. In this manner, the large cylindrical bayonet port of the manifold first stage will be snug fit to the internal walls and floor of first stage recess 16.

As noted above, each pair of elongated members 32 is shaped to fit within axially shaped slots 42 formed within the internal wall of second stage recess 18 between structural members 38. Slots 42 secure elongated members 32 of basket seal 30 such that once inserted basket seal 30 will not rotate or shift during filter cartridge replacement, when filter cartridge 10 is rotated relative to the manifold during attachment. This ensures base circumferential seal 34 remains in place during the complete installation procedure, and will resist rotation or twisting.

In one embodiment, bridge segments 40 are received within lateral slots 44 formed at the top back (radially outwards) side of structural member 38. The top portion of bridge segment 40 may also be flat to assist in forming floor 20 of first stage recess 16. By exposing the resilient material of basket seal 30 as a portion of floor 20, the manifold bayonet port that is received by first stage recess 16 will be subjected to at least partial sealing segments adjacent to flow ports 22. In another embodiment, bridge segments 40 may extend circumferentially around the second stage recess, forming a circumferential seal for the first stage recess floor 20.

Figure 5:
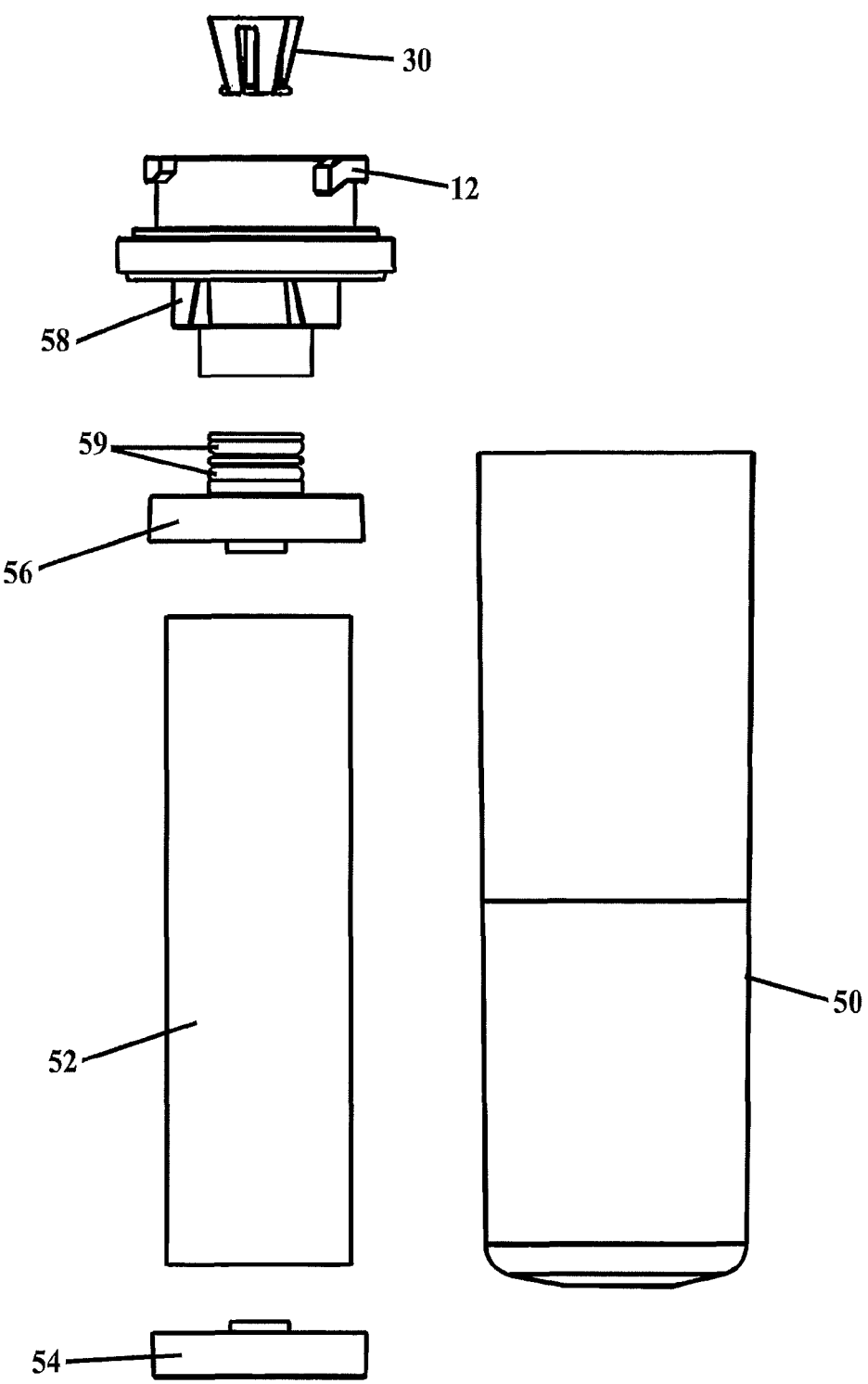
FIG. 5 depicts an exploded view of the components the filter cartridge of the present invention.

FIG. 5 depicts an exploded view of the components filter cartridge 10 of the present invention. Housing 50 is a sealed canister for encompassing filtering media 52. Filtering media 52 is secured by two end caps; a closed end cap 54, and an open end cap 56. Both end caps are securely fastened to filtering media 52, and once fastened, filtering media 52 with its end caps comprise a single unit. Open end cap 56 includes two circumferential O-ring seals 59 for mating with filter head 58. Filter head 58 mates with the manifold (not shown), and is secured by flanges 12 to the manifold assembly. Filter head 58 includes the two stage recesses for receiving the manifold cylindrical bayonet ports. Basket seal 30 is insertably secured within the second stage recess 18 of filter head 58.

Figure 6:
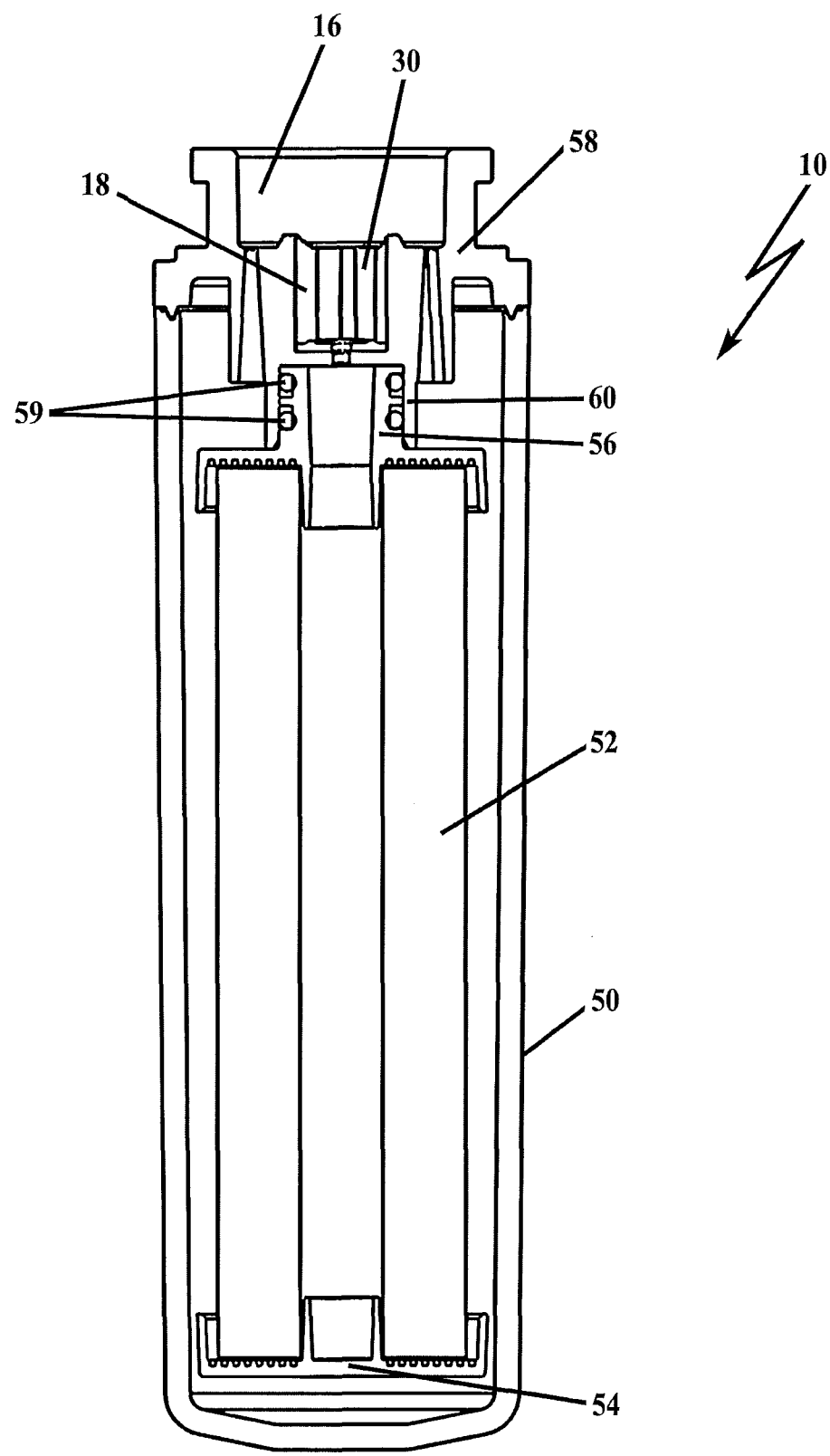
FIG. 6 is a cross-sectional view of the filter cartridge of the present invention.

FIG. 6 is a cross-sectional view of filter cartridge 10. First stage recess 16 and second stage recess 18 are depicted with basket seal 30 shown secured within second stage recess 18.

Filter head 58 is secured to housing 50 via spin welding, screw fit, or snap fit. Open end cap 56 includes annular grooves for supporting O-rings 59 to mate with the bottom cylindrical opening 60 of filter head 58. This junction forms the filter seal interface with filter head 58. First and second stage recesses 16, 18 form the head interface cavity area for mating with the complementary cylindrical bayonet ports of the manifold first and second stages.

As shown in FIG. 6, basket seal 30 is accessible from the top of filter cartridge 10, and may be removed and reinserted.

Figure 7:
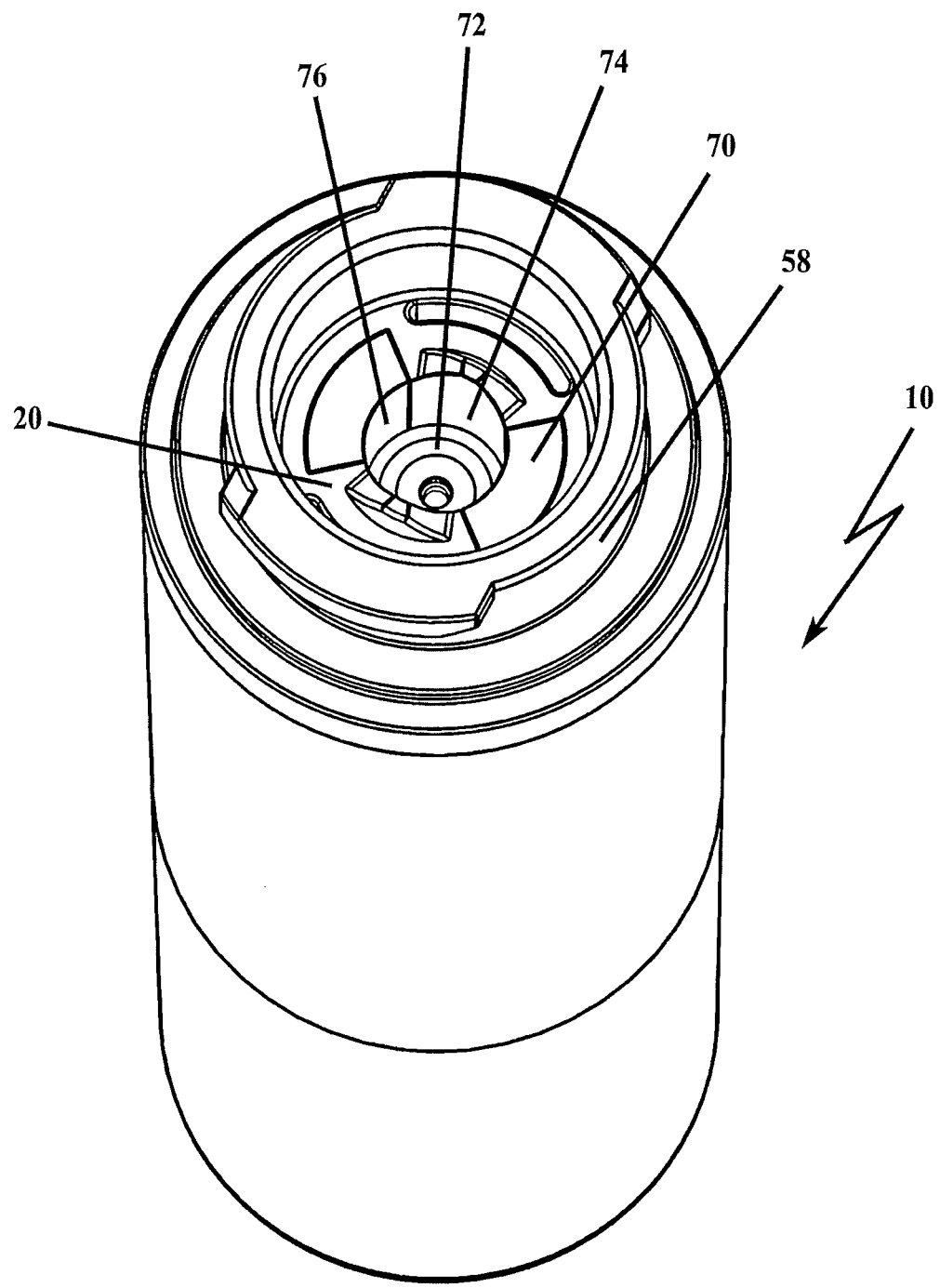
FIG. 7 is a perspective view of another embodiment of the filter cartridge of the present invention.

In another embodiment, as depicted in FIG. 7, basket seal 70 is configured with a base seal portion 72, forming a circumferential seal with the cavity wall 74 of second stage recess 18 of filter head 58, and a solid adjoining sidewall structure 76 extending axially upwards from base seal portion 72 toward the first stage recess bottom floor 20. The basket seal may extend circumferentially about the entire second stage recess cavity wall 74 or segmented into solid portions The present invention provides for a removably secured seal for forming a second stage water tight seal within a two stage cavity assembly for mating with a complementary manifold having cylindrical (male) bayonet ports. The seal includes a base circumferential seal with sidewall members extending axially upwards from the base seal; the sidewall members being insertable within cavities or slots formed in the second stage recess cylindrical cavity sidewall. By employing this type of seal, a filter cartridge of the present design can mate with a complementary manifold design that has degraded circumferential seals on its bayonet ports, and still provide a water-tight seal for a leak proof design when the filter cartridge replaces a spent cartridge on the manifold. The secured elongated members form a seal with the mating bayonet port of the manifold, while providing resistance to rotational force on the base circumferential seal when the filter cartridge is mated to the manifold.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A filter cartridge for mating with a two stage manifold comprising:
   a filter head having a top end with a two stage, coaxial cylindrical recess, said two stage recess including a first stage recess situated towards the top end of said filter head and extending axially away from said top end to form a bottom first stage recess floor, and a second stage recess situated at said first stage recess bottom floor, and extending axially away from said bottom floor and said top end, said second stage recess having a smaller diameter than said first stage recess;
   a housing secured by a water-tight bond to said filter head;
   a filter media within said housing and in fluid communication with said filter head;
   a seal insertably secured within said second stage recess, said seal having a base seal portion forming a circumferential seal with a cavity wall of said second stage recess, and an adjoining seal sidewall structure extending axially upwards from said base seal portion toward said first stage recess bottom floor.

2. The filter cartridge of claim 1 wherein said adjoining seal sidewall structure comprises at least a plurality of resilient sidewall segments.

3. The filter cartridge of claim 2 including slots formed within said second stage recess cavity wall to receive said seal sidewall segments.

4. The filter cartridge of claim 2 including said plurality of resilient sidewall segments attached at an end opposite said base seal portion by a bridge structure.

5. The filter cartridge of claim 4 wherein said bridge structure comprises the same resilient material as said sidewall segments.

6. The filter cartridge of claim 1 wherein said base seal portion comprises a resilient disc with a center circular aperture.

7. The filter cartridge of claim 1 wherein said base seal is integrally formed with said adjoining seal sidewall structure.

8. A filter cartridge comprising:
a housing having an open top end, and a closed bottom end;
a filter media within said housing, having an open end cap at a first end and a close end cap at a second end;
a filter head having a bottom end secured to said housing top end, and a filter head top end having a two stage cylindrical recess including a first stage recess having an open top end, a floor, and a first diameter, and a second stage recess having a second diameter, said first diameter greater than said second diameter, wherein said first and second stage recesses are coaxial, said second stage recess beginning at said first stage recess floor and extending axially downwards toward said filter media, said filter head top end adapted to receive complementary bayonet ports from a mating manifold; and
a resilient seal insertably secured within said second stage recess of said filter head, including:
a base circumferential seal; and
a plurality of elongated members attached to, and extending axially from, said base circumferential seal;
said resilient seal secured within said second stage recess by inserting said elongated members within slots formed within a cavity sidewall of said second stage recess.

9. The filter cartridge of claim 8 wherein said base circumferential seal is formed in the shape of a washer, having a thickness extending axially upwards within said second stage recess towards said filter head top end, and having a center circular aperture for fluid flow.

10. The filter cartridge of claim 9 wherein said base circumferential seal includes an annular groove coaxial with said center aperture for receiving said manifold bayonet port.

11. The filter cartridge of claim 8 wherein said base circumferential seal is integral with said plurality of elongated members.

12. The filter cartridge of claim 8 wherein each elongated member of said resilient seal is secured to at least one adjacent elongated member.

13. The filter cartridge of claim 12 including a bridge segment for attaching each elongated member of said resilient seal to said at least one adjacent elongated member.

14. The filter cartridge of claim 13 wherein said bridge segment comprises resilient material.

15. The filter cartridge of claim 8 wherein said slots formed within said second stage recess wall comprise elongated, axial cavities integrally formed with said cavity sidewall of said second stage recess, said slots adapted to receive said elongated members of said resilient seal in a compression fit.

16. The filter cartridge of claim 8 including elongated members of said resilient seal and said slots formed within said cavity sidewall of said second stage recess slotted segments having arcuate faces directed radially inwards to form a cylindrical cavity wall for receiving a manifold bayonet cylindrical port.

17. A filter head assembly for a filter cartridge comprising:
a filter head for directly mating to a manifold, said filter head including a two stage cavity having a first recess stage and a second recess stage, said second recess stage coaxial with, and internal to, said first recess stage and having a top surface coincident with a bottom surface of said first recess stage; and
a resilient seal including a disc-shaped base seal having a center aperture and a plurality of elongated members attached to, or integral with, said base seal, extending perpendicularly from said base seal in an axial direction, and insertably attached to a cavity sidewall of said filter head second recess stage.

18. The filter head assembly of claim 17 wherein each of said plurality of elongated members are attached at an end opposite said base seal by a bridge segment to at least one adjacent elongated member.

19. The filter head assembly of claim 17 including slots configured within said second stage recess cavity sidewall to receive said elongated members.

* * * * *